(12) United States Patent
Soe et al.

(10) Patent No.: US 7,134,619 B2
(45) Date of Patent: Nov. 14, 2006

(54) METHOD OF SEPARATING AND PROCESSING CATALYST CARRIERS

(75) Inventors: Koji Soe, Hitachi (JP); Shigeo Katsura, Hitachi (JP); Shingo Matsumoto, Hitachi (JP)

(73) Assignee: Nippon Mining & Metals Co., Ltd., Tokyo (JP)

( * ) Notice: Subject to any disclaimer, the term of this patent is extended or adjusted under 35 U.S.C. 154(b) by 410 days.

(21) Appl. No.: 10/771,336

(22) Filed: Feb. 5, 2004

(65) Prior Publication Data

US 2004/0156764 A1    Aug. 12, 2004

(30) Foreign Application Priority Data

Feb. 6, 2003 (JP) .............................. 2003-029683
Jan. 20, 2004 (JP) .............................. 2004-012337

(51) Int. Cl.
*B02C 19/12* (2006.01)
(52) U.S. Cl. ............... 241/19; 241/24.15; 241/24.14; 241/27; 241/29
(58) Field of Classification Search ............... 241/19, 241/24.14, 24.15, 27, 29; 423/22
See application file for complete search history.

(56) References Cited

U.S. PATENT DOCUMENTS 5,279,464 A    1/1994    Heinz et al.
5,783,062 A *  7/1998    Fogel et al. ............... 205/718
5,826,806 A * 10/1998    Hofmann .................... 241/1

FOREIGN PATENT DOCUMENTS

| JP | 2209433 A | 8/1990 |
| JP | 6-205993 A | 7/1994 |
| JP | 2000-248322 A | 9/2000 |

\* cited by examiner

*Primary Examiner*—Mark Rosenbaum
(74) *Attorney, Agent, or Firm*—Birch, Stewart, Kolasch & Birch, LLP

(57) ABSTRACT

A method of separating and processing a catalyst carrier that is contained in a processing object that includes a catalyst carrier metal cover to which an exhaust gas pipe is still connected, magnetic carrier foil or a ceramic carrier, a surface-enlarging coating film provided on the magnetic carrier foil or the ceramic carrier, and the catalyst carrier containing precious metal. This method includes the steps of: crushing the catalyst carrier and the metal cover to which the exhaust gas pipe is still connected, using a first crusher of a shearing type; breaking the catalyst carrier containing precious metal from the metal cover, using an impact-type pulverizer; and separating the catalyst carrier containing precious metals from the exhaust gas pipe and the metal cover, using a separator.

5 Claims, 5 Drawing Sheets

1
2
3

4

5 6 7

8 6 7

METHOD OF SEPARATING AND PROCESSING CATALYST CARRIERS

This Nonprovisional application claims priority under 35 U.S.C. § 119(a) on Patent Application No(s). 2003-029683 and 2004-012337 filed in JAPAN on Feb. 6, 2003 and Jan. 20, 2004, the entire contents of which are hereby incorporated by reference.

BACKGROUND OF THE INVENTION

1. Field of the Invention

The present invention relates to a method of processing a waste catalyst of an internal-combustion engine that has a metal cover connected to exhaust gas pipes, a catalyst carrier, and a γ-alumina coating film containing precious metals supported on the catalyst carrier. By this method, a precious metal concentrate can be separated from the other components, the components of the waste catalyst can be reused, and precious metal collecting can be performed through a copper smelting procedure and a precious metal collecting procedure.

2. Description of the Related Art

Conventionally, to purify exhaust gas, especially exhaust gas of the internal-combustion engine of an automobile, a metallic or ceramic catalyst carrier is used, as shown in FIGS. 1A through 3. A metal cover 10 attached to exhaust gas pipes 9 and 12 shown in FIG. 3 has a metallic or ceramic catalyst carrier provided therein. As shown in FIGS. 2A and 2B, the metallic or ceramic catalyst carrier is coated with a γ-alumina coating film 6 that is impregnated with precious metals 7 to serve as catalysts, such as platinum, palladium, or rhodium.

A metallic catalyst carrier can overcome the problems of poor starting characteristics at a cool temperature (or an ordinary temperature) and poor shock resistance that are often seen with a ceramic catalyst carrier. Therefore, more and more metallic catalyst carriers are being used in recent years.

The waste catalysts of an internal-combustion engine are accompanied by connection engaging pipes and the metal cover 10 having at least a pair of an input engaging pipe and an outlet engaging pipe, as shown in FIG. 3. The metal cover 10 covers a layer-type catalyst carrier 5 or a honeycomb-type catalyst carrier 8, as shown in FIGS. 2A and 2B. Also, the precious metals 7 as catalyst materials and the thin γ-alumina coating film 6 are provided on the surface of the catalyst carrier, as shown in FIGS. 2A and 2B.

The metal covers 10 and 2 and the exhaust gas pipes 9 and 12 shown in FIGS. 1A and 1B and FIGS. 3A and 3B are normally made of high-grade steel or nonmagnetic ferroalloy.

The metallic catalyst carrier 1 shown in FIG. 1A is made of a very thin ferromagnetic Fe—Cr—Al alloy. Carrier foil 3 that forms each layer is molded in a smooth form and a wave form alternately. Each peak of the waves is brought into contact with the foil of the adjacent layer, and can be joined to the foil by spot welding. The surface of the γ-alumina coating film 6 on the metallic catalyst carrier 1 is impregnated with the precious metals 7.

The ceramic catalyst carrier 4 shown in FIG. 1B is made of cordierite ($2MgO$—$2Al_2O_3$—$5SiO_2$), and takes the honeycomb form 8, as shown in FIG. 2B. In the ceramic catalyst carrier 4, the surface of the γ-alumina coating film 6 is also impregnated with the precious metals 7.

The foil 3 of the metallic catalyst carrier 1 is as thin as 20 μm to 30 μm, and has a small heat capacity. Accordingly, the metallic catalyst carrier can be quickly heated by exhaust gas of the internal-combustion engine, and a catalytic effect starts appearing only a short time after the internal-combustion engine is activated. Being not greatly affected by mechanical or thermal impact, the metallic catalyst carrier 1 can be provided in a closer position to the engine than the catalysts in a ceramic catalyst carrier in the exhaust pipe. Accordingly, the heating can be quickly carried out.

However, it is extremely difficult to separate the γ-alumina coating film and the precious metals from the foil of a metallic catalyst carrier. As a result, most metallic catalyst carriers are scrapped, and the precious metals are not recovered.

Among catalyst carriers, ceramic catalyst carriers are mechanically separated from automobiles that are being scrapped, and catalytic materials such as platinum, palladium, and rhodium, are recovered.

The materials to be separated are the catalysts used in internal-combustion engines to be scrapped. The recovering of waste catalysts from an internal-combustion engine is not necessarily performed with a desired precision. As a result, mechanically damaged catalysts or catalysts still connected to a damaged connecting engaging pipe or exhaust gas pipes are often delivered as goods.

Japanese Unexamined Patent Publication No. 2000-248322, titled "Method of Recovering Platinum Group Element from Metal Substrate Catalyst", discloses a method of processing a metallic catalyst carrier, with a metal cover remaining the metallic catalyst carrier. In this prior art, a catalyst that is impregnated with precious metals is heated together with a metal cover in an electric furnace, so that the precious metal is absorbed by copper, and that the copper is oxidized to concentrate and recover the precious metals. The metal cover and the magnetic carrier foil, such as Fe—Cr—Al alloy foil, are oxidized and then discharged as slag.

Japanese Patent Publication No. 2645789, titled "Method of and Apparatus for Recycling Catalytic Converters", also discloses a method of separating a metallic catalyst carrier. In this method, an impact-type crusher is combined with a pneumatic separation system. Each metallic catalyst carrier is disassembled to various pieces that can be recycled as usable components at the stage of delivery. The components used for recovering precious metals contain catalytic precious metals at a high concentration. Accordingly, this method of separating a metallic catalyst carrier involves neither chemicals nor toxic substances.

In the prior art disclosed in Japanese Unexamined Patent Publication No. 2000-248322, however, the γ-alumina containing the precious metals supported on a metallic catalyst carrier is not removed from the Fe—Cr—Al alloy foil, and the metal cover is not removed either. It is therefore necessary to oxidize and dissolve the Fe—Cr—Al alloy foil and the metal cover. As a result, a large quantity of slag is generated, and, compared with a case of processing a ceramic catalyst carrier, higher process costs are required.

In the prior art disclosed in Japanese Patent Publication No. 2645789, the impact-type crushing is performed in one step. In this manner, a metal cover that is not easily crushed and a metallic catalyst carrier that can be easily crushed are subjected to crushing at the same time, resulting in a poor crushing efficiency. Furthermore, with a fixed discharging screen of an impact type, the fragments of the metal cover that is made of high-grade steel or nonmagnetic ferroalloy containing nickel are deformed into round shapes. As a result, it becomes difficult to prevent contamination of the metallic catalyst carrier containing precious metals.

SUMMARY OF THE INVENTION

It is therefore an object of the present invention to provide a catalyst carrier separating method in which the above disadvantage is eliminated.

A more specific object of the present invention is to provide a method of separating waste catalysts of an internal-combustion engine having metallic catalyst carriers, without chemicals and toxic substances. By this method, each component is decomposed into various materials that can be recycled as usable components through simple procedures, even if the waste catalysts of an internal-combustion engine are in a disassembled state, and if a metallic catalyst carrier and a ceramic catalyst carrier coexist. The components used for recovering precious metals contain most catalytic precious metals.

A method of separating and processing a catalyst carrier that is contained in a processing object that includes a catalyst carrier metal cover to which an exhaust gas pipe is still connected, and magnetic carrier foil or a ceramic carrier, a surface-enlarging coating film provided on the magnetic carrier foil or the ceramic carrier, and the catalyst carrier containing precious metal, the method comprising the steps of: crushing the catalyst carrier and the metal cover to which the exhaust gas pipe is still connected, using a first crusher of a shearing type; breaking the catalyst carrier containing precious metal from the metal cover, using an impact-type pulverizer; and separating the catalyst carrier containing precious metal from the exhaust gas pipe and the metal cover, using a separator.

The above method may be configured so that it further comprises the steps of: crushing a metallic catalyst carrier containing precious metal, using a second crusher, the crushing being carried out after the separating step using the separator; and dividing fragments and particulate matters containing the precious metal into a precious metal concentrate and catalyst carrier pieces not containing a great amount of the precious metal.

The above method may be configured so that it the separator is a pneumatic separator.

The above method may be configured so that the separator is a sieving separator.

The above method may be configured so that it further comprises the steps of: dividing the catalyst carrier containing precious metal that have been separated by the separator into magnetic matters and nonmagnetic matters, using a magnetic separator; and crushing the magnetic matters, using a second crusher.

According to the present invention, the following effects can be obtained.

(1) Crushing/separating is attained without performing pretreatment that removes an exhaust gas pipe, a manifold, a protective cover, and a metal cover.

(2) The precious metals that have dipped into a catalyst carrier are easily recoverable as an object as a result of high purity.

(3) By combining a copper refining process, the precious metals that have dipped into a catalyst carrier are efficiently recoverable.

(4) The precious metals that are not main component parts like weight of a catalyst carrier can be collected in high purity, and each component parts can be further collected on the type basis.

(5) The precious metals (Pt, Pd, Rh, etc.) with little Fe can obtain a metal catalyst carrier with 95–98% of high recovery rate by carrying out magnetic-separation processing after the 2nd step of crushing/sieving.

(6) Since treating by a converter, Fe is removed beforehand, so the amount of slag can be reduced in converter operation. The amount of treatment can be decreased on the briquette processing etc.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1A:
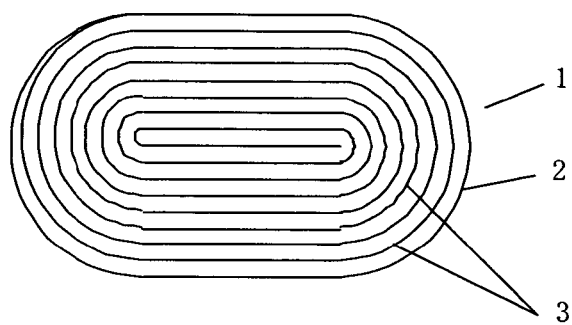
FIG. 1A is a transverse section view of a metallic catalyst carrier having the transverse section in a spiral form.

The following is a detailed description of the present invention.

The present invention is characterized in that the catalyst carrier in a waste catalyst of an internal-combustion engine is mechanically crushed to fragments or particles, the fragments have different weights and shapes, and, utilizing the differences, the fragments containing precious metals are separated from the other fragments by an optimized crushing system.

A metallic catalyst carrier can be reused as stainless scrap. However, it is possible to process a metallic catalyst carrier through a copper smelting procedure, so as to recover the small amount of precious metals contained in the carrier. A study of a metallic catalyst carrier revealed that, compared with the exhaust gas pipes and the metal cover that have sufficient strength, the carrier foil is greatly weakened by heat and can be very easily crushed. Also, the γ-alumina coating film provided on the carrier can be peeled off by impact, and can be easily broken to particles.

After being detached from the metal cover, the catalyst carrier is roughly crushed and then sieved, so as to recover the γ-alumina from the metallic catalyst carrier with high precision. The γ-alumina contains precious metals and is employed as a coating film for enlarging the surface area of the metallic catalyst carrier.

It was also found that a ceramic catalyst carrier is very weak, compared with the exhaust gas pipes and the metal cover that have sufficient strength. Accordingly, a ceramic catalyst carrier can be easily detached from the metal cover through a crushing process, and the γ-alumina that contains precious metals and is employed as a coating film for increasing the surface area can be efficiently recovered.

Hereinafter, the coating film for increasing the surface area will be described as a γ-alumina coating film, though the material of the coating film is not limited to γ-alumina.

More specifically, a set of components accompanying the waste catalysts of an internal-combustion engine are divided into a group of exhaust gas pipes and the metal cover and a group of catalyst carrier pieces containing precious metals, through a crushing and physically separating process that is the first stage of the operation.

The metallic catalyst carrier is then divided into the material of the metal cover, such as Fe—Cr—Al alloy, and the γ-alumina impregnated with precious metals, through another crushing and physically separating process that is the second stage of the operation.

The fragments, which have been sheared by a shearing machine having blades of 50 mm to 100 mm in width in the first stage, are then divided into the fragments of the metal cover and the fragments of the catalyst carrier by an impact-type pulverizer such as a cage mill, with the catalyst carrier being still joined to the exhaust gas pipes and the metal cover.

The above mentioned shearing-type crusher may be a 2-shaft shearing-type crusher. With such a crusher, a high shearing efficiency can be achieved. Even if hard fragments enter an apparatus, damage to the apparatus can be prevented by virtue of the low rotation speed of such a crusher.

As the materials remain inside the above shearing-type crusher and the impact-type pulverizer only for a very short time, the fragments of the exhaust gas pipes and the metal cover are not deformed into round forms. Thus, contamination of the metal catalyst carrier containing precious metals can be prevented.

The cage mill that is an example of the impact-type pulverizer can be used as a separator, instead of a crusher, for separating the catalyst carrier from the exhaust gas pipes and the metal cover. As a result of a process using the cage mill, fragments and particles of the metal catalyst carrier can be obtained separately from the fragments of the exhaust gas pipes and the metal cover.

Also, with the impact caused by the cage mill, a ceramic catalyst carrier can be broken to particles, and most of the γ-alumina coating film containing precious metals supported on the metallic catalyst carrier can be peeled off.

In a case of processing a ceramic catalyst carrier, separation can be easily performed through pneumatic separation or sieving separation in the next step. This step will be more specifically described later as third and fourth embodiments of the present invention.

The sieving separation, however, should preferably be performed through magnetic separation, so as to shut off metallic fragments that act as contaminants. The magnetic separation will be more specifically described later as the fourth embodiment of the present invention.

In a case of processing a metallic catalyst carrier, however, after the pneumatic separation or the sieving separation, it is necessary to further divide the catalyst carrier into a precious metal concentrate and fragments of the metallic catalyst carrier still including the γ-alumina containing precious metals. This is because a metallic catalyst carrier contains a great amount of metal in the form of metallic foil or the like.

In the second crushing and physically separating process, it is possible to process only the magnetic carrier foil such as Fe—Cr—Al alloy foil of the metallic catalyst carrier that is still coated with the γ-alumina containing precious metals. In this manner, a smaller crusher can be employed.

Hereinafter, the magnetic carrier foil will be described as Fe—Cr—Al alloy foil, though the composition of the magnetic carrier foil is not limited to Fe—Cr—Al alloy.

The crusher used in the second stage may be a hammer crusher, for example. At the discharging end of the hammer crusher, a screen of 2 mm to 10 mm in pore diameter, more preferably, a screen of 4 mm to 6 mm in pore diameter is provided to adjust the fragment sizes and particle sizes within the range of 2 mm to 10 mm in diameter. Receiving the impact of the crushing, the γ-alumina coating film containing precious metals peels off the Fe—Cr—Al alloy foil that is a part of a metallic catalyst carrier, and accordingly, the precious metals can be concentrated to obtain a fine particle concentrate.

So as to recover the precious metals removed from the Fe—Cr—Al alloy foil that is a component of a metallic catalyst carrier, sieving separation is performed with a sifter having 0.3 mm to 1.0 mm sieve openings. Through the sieving separation, a precious metal concentrate that is carried on γ-alumina and still contains a small amount of Fe—Cr—Al alloy foil particles is obtained under the sifter, and the Fe—Cr—Al alloy foil particles remain on the sifter. In this manner, 96% to 98% of the precious metals contained in a metallic catalyst carrier can be recovered in the precious metal concentrate. (In the first embodiment, a metallic catalyst carrier is processed by a pneumatic separator, and a hammer crusher is employed as the crusher in the second stage. In the second embodiment, a metallic catalyst carrier is processed by a sieving separator, and a hammer crusher is employed as the crusher in the second stage.)

As described above, the nonmagnetic steel containing nickel is separated from magnetic steel through the crushing and physically separating process in the first stage, and a ceramic catalyst carrier containing precious metals and a precious metal concentrate of the γ-alumina containing precious metals supported on a metallic catalyst carrier are obtained. Through the crushing and physically separating process in the second stage, the γ-alumina containing precious metals is separated from the Fe—Cr—Al alloy foil.

In this manner, the components can be separated from one another through simple procedures, and can be reused as pure original materials.

If emphasis is put on the precious metal recovery rate, the sieve openings should be made larger to recover almost all the precious metals of a catalyst. In that case, a small amount of metallic catalyst carrier foil is also recovered together with the precious metals. However, if a copper smelting procedure is employed, the nickel contained in the metal cover is completely removed in the crushing and separating process of the first stage, and does not cause a problem.

The dust generated from the crushers, the magnetic separator, the sieving separator, and the feeder, contains a great amount of precious metals. It is therefore necessary to collect the dust. The dust collecting should be carried out also for environmental reasons. The dust collected by a bag filter is processed through the physically separation in the first stage, so that the fragmented metallic catalyst carrier is removed, and that the iron-group metallic materials that act as impurities for a precious metal concentrate are removed. In this manner, degradation of the precious metal concentration can be prevented.

The following is a description of preferred embodiments of the present invention, with reference to the accompanying drawings.

(First Embodiment)

In the first embodiment of the present invention, each "metallic catalyst carrier" is processed by a "pneumatic separator", and a "hammer crusher" is used as the crusher in the second stage.

Figure 1B:
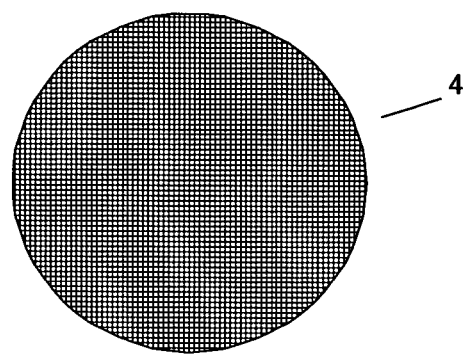
FIG. 1B is a transverse section view of a honeycomb-type ceramic catalyst carrier.
Figure 2A:
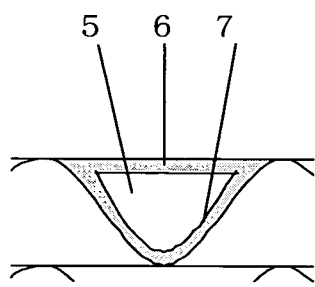
FIG. 2A is a partially enlarged section view of the metallic catalyst carrier shown in FIG. 1A.
Figure 2B:
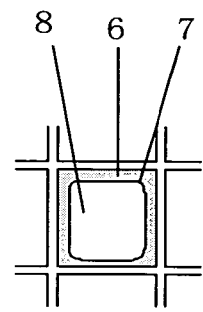
FIG. 2B is a partially enlarged section view of the ceramic catalyst carrier shown in FIG. 1B.
Figure 3:
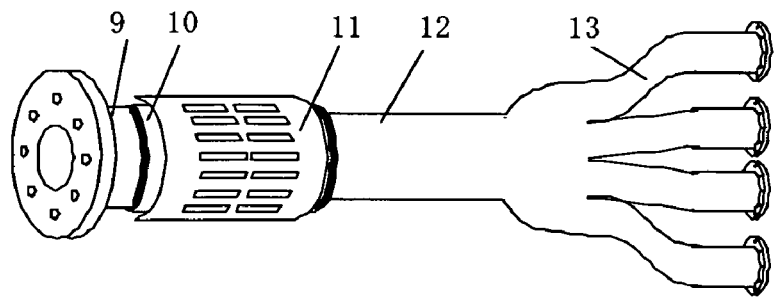
FIG. 3 is a perspective view of a metal cover that covers a catalyst carrier, with exhaust gas pipes, a manifold, and a protection cover, being connected to the metal cover.

FIG. 1A is a transverse section view of a metallic catalyst carrier having the transverse section in a spiral form. FIG. 1B is a transverse section view of a honeycomb-type ceramic catalyst carrier. FIGS. 2A and 2B are partially expanded views of the metallic catalyst carrier and the ceramic catalyst carrier shown in FIGS. 1A and 1B, respectively. FIG. 3 illustrates a set of waste catalysts of an automobile to which an exhaust gas pipe is connected. The catalysts of an automobile are protected by a metal cover 10 (2).

Waste catalyst carriers of automobiles take various geometric forms of various sizes. The metallic catalyst carrier 1 shown in FIG. 1A is covered with a circular or oval cylinder-like metal cover 2 that is 2 mm thick and is made of high-grade steel or nonmagnetic steel containing nickel.

FIG. 1B shows the transverse section of a ceramic catalyst carrier 4.

In the metallic catalyst carrier 1, layers of carrier foil 3 are arranged in an S-shaped form or a spiral form. Also, the layers of the carrier foil 3 take a smooth form and a wavy form alternately. The carrier foil 3 is made of a Fe—Cr—Al alloy of 20 μmm to 30 μmm in thickness.

In the ceramic catalyst carrier 4, ceramic layers are integrally molded in a honeycomb form.

FIG. 2A is a partially enlarged transverse section view of the metallic catalyst carrier 1. FIG. 2B is a partially enlarged transverse section view of the ceramic catalyst carrier 4.

A typical metallic catalyst carrier has pipelines 5 each having a triangular shape and penetrating in the longitudinal direction. The pipelines 5 serve to allow exhaust gas of the automobile to pass through the space formed between the flat carrier foil part and each top end of wavy foil part. The upper surface of each of the pipelines 5 is coated with a γ-alumina coating film 6, and the upper surface of the γ-alumina coating film 6 is impregnated with precious metals 7 that can act as catalysts, such as platinum, palladium, and rhodium.

In a typical ceramic catalyst carrier, on the other hand, pipelines 8 that are molded in a honeycomb form are coated with the γ-alumina coating film 6, and the surface of the γ-alumina coating film 6 is impregnated with the precious metals 7 that act as catalysts, such as platinum, palladium, and rhodium.

FIG. 3 shows the structure in which exhaust gas pipes 9 and 12 are connected to the front and rear ends of the metal cover 10 covering the catalyst carrier and a protection cover 11 covering the heat insulating material on the metal cover 10. In this structure, the exhaust gas pipes 9 and 12 may still have a manifold 13 connected thereto. Each of the exhaust gas pipes 9 and 12 and the manifold 13 is 5 mm thick, and the length of the exhaust gas pipe that covers the metal cover 10 covering the catalyst carrier is 0.5 m to 1.0 m. Being made of cast steel, the exhaust gas pipes 9 and 12 and the manifold 13 are hard.

Figure 4:
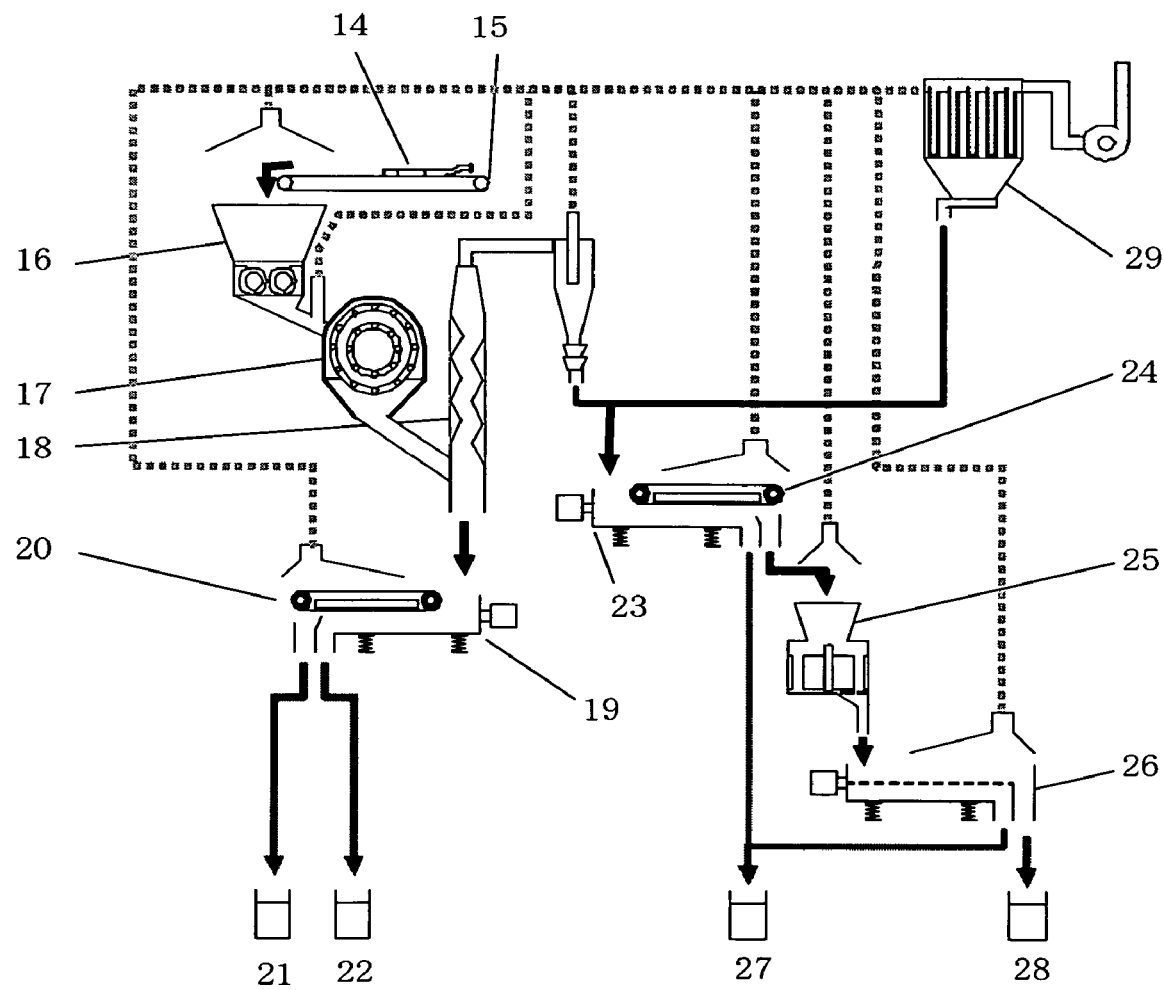
FIG. 4 is a flowsheet schematically illustrating a method of separating and processing a "metallic catalyst carrier" of waste catalysts of an internal-combustion engine, utilizing a "pneumatic separator", in accordance with a first embodiment of the present invention.

FIG. 4 illustrates a method of separating objects containing a "metallic catalyst carrier" of waste catalysts of an internal-combustion engine using a shearing-type crusher and a cage mill that is a kind of an impact-type pulverizer. FIG. 4 also illustrates a processing method that utilizes a "pneumatic separator".

The first embodiment of the present invention will be further described below in greater detail.

A conveyor 15 feeds a waste catalyst 14 of an automobile having a metallic catalyst carrier into a 2-shaft shearing crusher 16 that is a shearing-type crusher. The crusher 16 has a 100-HP electric motor. The crusher 16 also has two rotational shafts that rotate in the horizontal direction at low speeds of 13 rpm and 16 rpm, respectively. A disc-like shearing blade of 50 mm in width is attached to each of the rotational shafts in an alternate manner.

In the crusher 16, the exhaust gas pipes 9 and 12, the manifold 13, the protection cover 11, the metal cover 10, and the metallic catalyst carrier 1 are pulverized or sheared to pieces of 50 mm in width. The metallic catalyst carrier 1 covered with the metal cover 10 is then exposed. At this point, the metal cover 10 and the metallic catalyst carrier 1 are still joined to each other, though being about to come apart from each other.

The exhaust gas pipes 9 and 12 that are made of hard cast steel, and the manifold 13, are compressively crushed at the time of shearing, and are crushed to fragments.

The protection cover 11, the metal cover 10, and the metallic catalyst carrier 1 are cut in round slices at the time of shearing. Part of the γ-alumina coating film 6 containing precious metals supported on the metallic catalyst carrier 1 is peeled off and turned into particles.

The metal cover 10 that is still joined to the metallic catalyst carrier 1 is separated from the metallic catalyst carrier 1 by the cage mill 17. The cage mill 17 also pulverizes the spiral or S-shaped carrier foil 3 to fragments. The cage mill 17 has two cage-type rotors that rotate in opposite directions to each other. More specifically, each of the two cage-type rotors rotates at a rotational speed of 1000 rpm and at a relative circumferential speed of 80 m/s, thereby feeding raw materials into the center of an inner cage. The distance between each two pins of the cages is 100 mm. Therefore, the raw materials do not remain inside for a long time, and are quickly separated and immediately discharged.

The discharged objects are then processed by a pneumatic separator 18 at a wind speed of 15 m/s. The pneumatic separator 18 separates the small and light fragments of the metallic catalyst carrier 1 and the particles of the γ-alumina coating film 6 containing precious metals, from the large and heavy fragments of the exhaust gas pipes 9 and 12, the manifold 13, the protection cover 11, and the metal cover 10.

The fragments of the exhaust gas pipes 9 and 12, the manifold 13, and the protection cover 11, which have been processed by the cage mill 17 and separated by the pneumatic separator 18, are then divided into iron scrap 21 and nonmagnetic scrap 22 by a magnetic separator 20 that is hung above a vibratory conveyor 19.

Meanwhile, the fragments of the metallic catalyst carrier 1 and the particles of the γ-alumina coating film 6 containing precious metals are processed by a magnetic separator 24 that is hung above a vibratory conveyor 23, so as to obtain the fragments of the metallic catalyst carrier 1 on the magnetic side, and a precious metal concentrate of the γ-alumina that has been peeled off the metallic catalyst carrier 1 and contains precious metals, on the nonmagnetic side.

The fragments of the metallic catalyst carrier on the magnetic side are further pulverized by a compact hammer crusher 25, so as to remove the remnants of the γ-alumina coating film 6 from the metallic catalyst carrier 1.

The compact hammer crusher 25 includes two fixed blades and a rotor that has four sets of plate-like hammers that rotate in the vertical direction. The rotating blades of the rotor of the compact hammer crusher 25 rotate at a rotational speed of 750 rpm and at a circumferential speed of 16 m/s. At the discharging end of the compact hammer crusher 25, a screen of 5 mm in pore diameter is provided to reduce the sizes of the pulverized objects to 5 mm or smaller.

At this point, a particulate object 28 of the Fe—Cr—Al alloy foil as a part of the metallic catalyst carrier 1 is obtained on the magnetic side, while a precious metal concentrate 27 including fragmented objects of various sizes, forms, and weights, such as the particles of the γ-alumina film 6 containing precious metals, is obtained on the nonmagnetic side.

As shown in Table 1-B, most of the iron materials are allocated to the magnetic side, while most of materials such as nickel and chromium are allocated to the nonmagnetic side.

Table 1-A shows the crushed particle sizes and precious metal recovery data that were obtained as a result of an operation performed on waste catalysts of an automobile having a metallic catalyst carrier. As can be seen from Table 1-A, there is a region in which precious metals greatly concentrate. Table 1-B shows the crushing and separation data that were obtained when separation was performed selectively on particles of 0.3 mm or smaller in size. As can be seen from Table 1-B, the precious metals were recovered with high efficiency. More specifically, 95.7% of platinum, 98.1% of palladium, and 97.7% of rhodium, were recovered.

Through a sieving process carried out by a vibratory sifter 26 that has 1 mm sieve openings, the precious metal concentrate 27 has a high precious metal recovery rate, containing 95% to 98% of the precious metals such as platinum, palladium, and rhodium. The particulate object 28 of the Fe—Cr—Al alloy foil of the metal catalyst carrier only has a precious metal recovery rate of 2% to 5%.

The above crushers, the magnetic separators, the sifter, and the feeders such as the vibratory conveyors, generate dust that contains a large quantity of precious metals. Therefore, a bag filter 29 is provided to collect the dust.

The collected dust is then processed through physical selection that is the first step in the operation. In the physical selection procedure, the fragmented metallic catalyst carrier is removed, so that iron-group metallic materials that act as impurities for the precious metal concentrate can be eliminated. Thus, degradation of the precious metal concentrate is prevented.

A metallic catalyst carrier that does not contain nickel does not adversely affect a copper smelting procedure that involves pyro-processing. For this reason, a metallic catalyst carrier can be processed through a copper smelting procedure using a PS converter, for example.

Furthermore, the amount of Fe decreases through the magnetic selection carried out on the precious metal concentrate in the pyro-processing for collecting the precious metals. As a result, the amount of slag in an electric furnace can be reduced. Also, in a case of carrying out briquetting or pelletizing in an electric furnace, the amount of charge can be reduced.

In a case of performing hydro-processing, the magnetic separation is also carried out to remove Fe. Thus, the amount

TABLE 1-A

| METALLIC CATALYST CARRIER | RECOVERY RATE | | | | | | |
|---|---|---|---|---|---|---|---|
| | WEIGHT | Pt | Pd | Rh | Fe | Cr | Ni |
| −5.0/+0.5 mm | 72.7% | 2.7% | 1.0% | 1.5% | 89.7% | 75.7% | 67.7% |
| −0.5/+0.3 mm | 3.7% | 1.1% | 0.6% | 0.6% | 3.7% | 7.0% | 14.9% |
| −0.3/+0.15 mm | 3.6% | 6.4% | 2.6% | 2.5% | 1.9% | 3.5% | 7.0% |
| −0.15/+0.075 mm | 4.7% | 16.6% | 5.5% | 6.6% | 1.6% | 2.8% | 3.3% |
| −0.075 mm | 15.3% | 73.2% | 90.3% | 88.8% | 3.1% | 11.0% | 7.1% |

TABLE 1-B

| | RECOVERY RATE | | | | | | |
|---|---|---|---|---|---|---|---|
| | WEIGHT | Pt | Pd | Rh | Fe | Cr | Ni |
| MAGNETIC MATERIALS 21 | 72.5% | 0.3% | 0.2% | 0.1% | 82.0% | 0.0% | 0.0% |
| NONMAGNETIC MATERIALS 22 | 10.5% | 0.2% | 0.1% | 0.1% | 9.0% | 64.6% | 91.0% |
| PARTICLULATE MATTERS OF ALLOY FOIL 28 (+0.3 mm) | 13.0% | 3.8% | 1.6% | 2.1% | 8.4% | 29.3% | 7.4% |
| PRECIOUS METAL CONCENTRATE 27 (−0.3 mm) | 4.0% | 95.7% | 98.1% | 97.7% | 0.6% | 6.1% | 1.6% | of charge can be reduced, and the precious metals can be efficiently leached out. Furthermore, the processing equipment can remain small.

(Second Embodiment)

Figure 5:
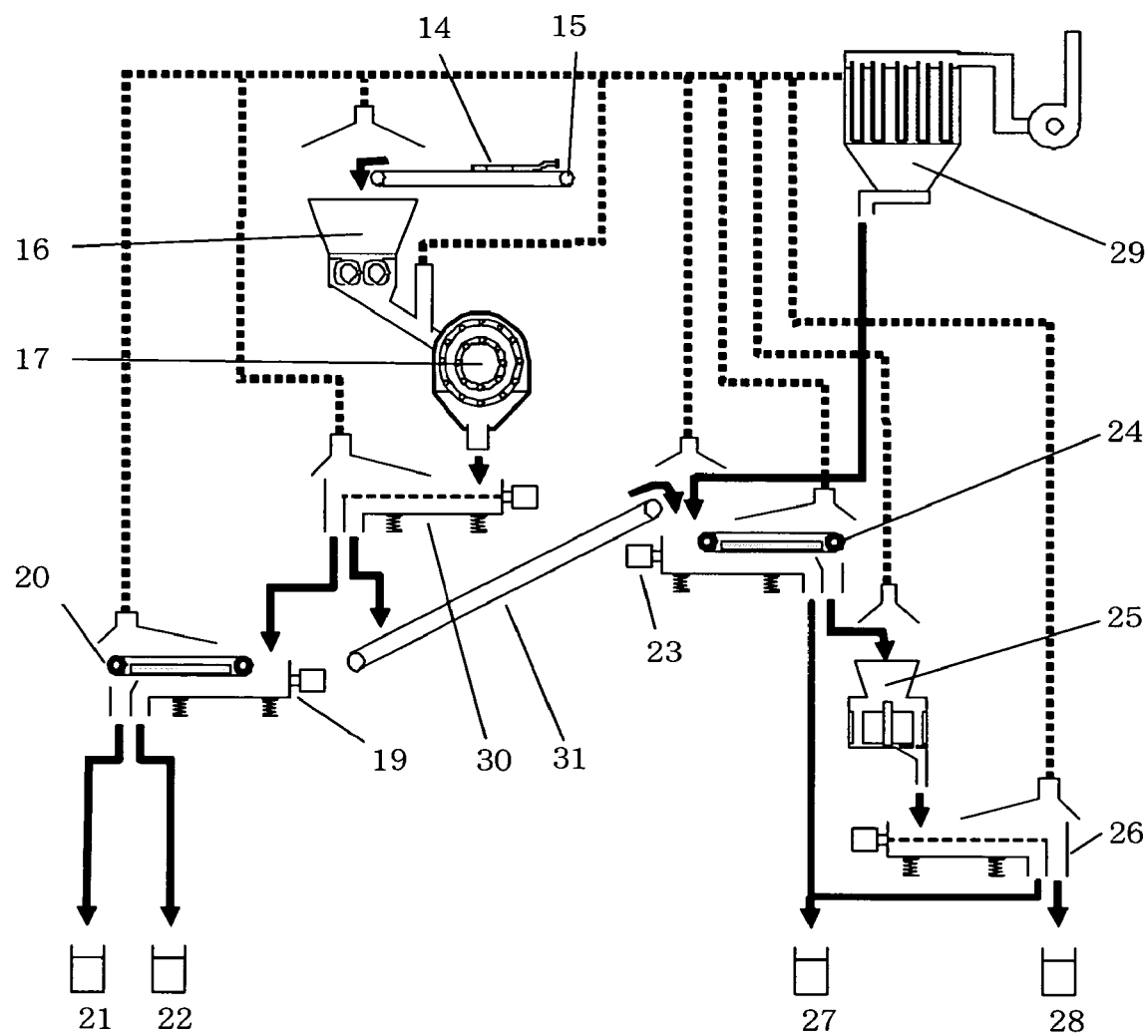
FIG. 5 is a flowsheet schematically illustrating a method of separating and processing a "metallic catalyst carrier" of waste catalysts of an internal-combustion engine, utilizing a "sieving separator", in accordance with a second embodiment of the present invention.

FIG. 5 illustrates a method of separating a "metallic catalyst carrier" of waste catalysts of an internal-combustion engine, utilizing a shearing-type pulverizer and a cage mill that is an impact-type crusher. The structure shown in the flowsheet of FIG. 5 is characterized by the use of a "sieving separator", instead of a "pneumatic separator".

In the following, a second embodiment of the present invention will be described in detail.

The object to be processed, and the shearing-type crusher and the cage mill as an impact-type pulverizer to be used in this embodiment, are the same as those used in the first embodiment. Also, the processing conditions in this embodiment are the same as those in the first embodiment. Therefore, explanation of them is omitted herein.

The objects discharged from the cage mill are subjected to sieving separation performed by a vibratory sifter 30 that has 30 mm sieve openings. Through the sieving separation, the small and light particulate objects of the fragmented metallic catalyst carrier 1 and the γ-alumina coating film 6 containing embodiment. Accordingly, it is of course possible to obtain the particulate object 28 of the Fe—Cr—Al alloy foil that is a part of the metallic catalyst carrier 1, and the precious metal concentrate 27 including fragmented objects of various sizes, forms, and weights, such as the particles of the γ-alumina film 6 containing precious metals.

Table 2 shows the crushed particle sizes and precious metal recovery data that were obtained as a result of a separating operation carried out on waste catalysts of an automobile having a metallic catalyst carrier. As can be seen from Table 2, there is a region in which precious metals greatly concentrate. When separation was performed selectively on particles of 0.3 mm or smaller in size, the precious metals were recovered with high efficiency. More specifically, 95.0% to 95.2% of platinum, 95.0% to 97.4% of palladium, and 92.0% to 97.3% of rhodium, were recovered.

Through a sieving process carried out by a vibratory sifter 26 that has 1 mm sieve openings, the precious metal concentrate 27 achieves a high precious metal recovery rate, containing 95% to 97% of the precious metals such as platinum, palladium, and rhodium. Meanwhile, the particulate object 28 of the Fe—Cr—Al alloy foil of the metal catalyst carrier 1 exhibits a low precious metal recovery rate of 3% to 5%.

TABLE 2

| | RECOVERY RATE | | | | | | |
|---|---|---|---|---|---|---|---|
| | WEIGHT | Pt | Pd | Rh | Fe | Cr | Ni |
| MAGNETIC MATERIALS 21 | 66.7% | 0.5% | 0.4% | 0.2% | 71.3% | 7.4% | 0.0% |
| NONMAGNETIC MATERIALS 22 | 9.8% | 0.2% | 0.2% | 0.1% | 7.2% | 55.6% | 90.2% |
| PARTICLULATE MATTERS OF ALLOY FOIL 28 (+0.3 mm) | 18.5% | 4.1% | 2.0% | 2.4% | 18.9% | 31.0% | 8.0% |
| PRECIOUS METAL CONCENTRATE 27 (−0.3 mm) | 5.0% | 95.2% | 97.4% | 97.3% | 2.6% | 6.0% | 1.8% | precious metals are separated from the large and heavy objects such as the exhaust gas pipes 9 and 12, the manifold 13, the protection cover 11, and the metal cover 10.

The exhaust gas pipes 9 and 12, the manifold 13, the protection cover 11, and the metal cover 10, which have been processed by the cage mill and separated from the other objects, are then divided into magnetic iron scrap 21 and nonmagnetic scrap 22 by a magnetic separator 20 that is hung above a vibratory conveyor 19.

Among the resultant objects, most iron materials are allocated to the magnetic side, while most materials such as nickel and chromium are allocated to the nonmagnetic side, as shown in Table 2.

The fragmented metallic catalyst carrier 1 and the particulate objects of the γ-alumina coating film 6 containing precious metals are transported on a belt conveyor 31, and are then supplied to a magnetic separator 24 that is hung above a vibratory conveyor 23. The magnetic separator 24 removes the γ-alumina containing precious metals from the metallic catalyst carrier 1. By doing so, the magnetic separator 24 allocates the metallic catalyst carrier 1 to the magnetic side, and a precious metal concentrate to the nonmagnetic side.

The procedures to be carried out after this are the same as the corresponding procedures of the first embodiment that utilizes a hammer crusher and a vibratory sifter. The processing conditions are also the same as those in the first The above crushers, the magnetic separators, the sifter, and the feeders such as the vibratory conveyors, generate dust that contains a large quantity of precious metals. Therefore, a bag filter 29 is provided to collect the dust.

The collected dust is then processed through a physical selection procedure that is the first step. Through the physical selection procedure, the fragmented metallic catalyst carrier is removed, so that iron-group metallic materials that act as impurities for the precious metal concentrate can be eliminated. Thus, degradation of the precious metal concentrate is prevented.

(Third Embodiment)

Figure 6:
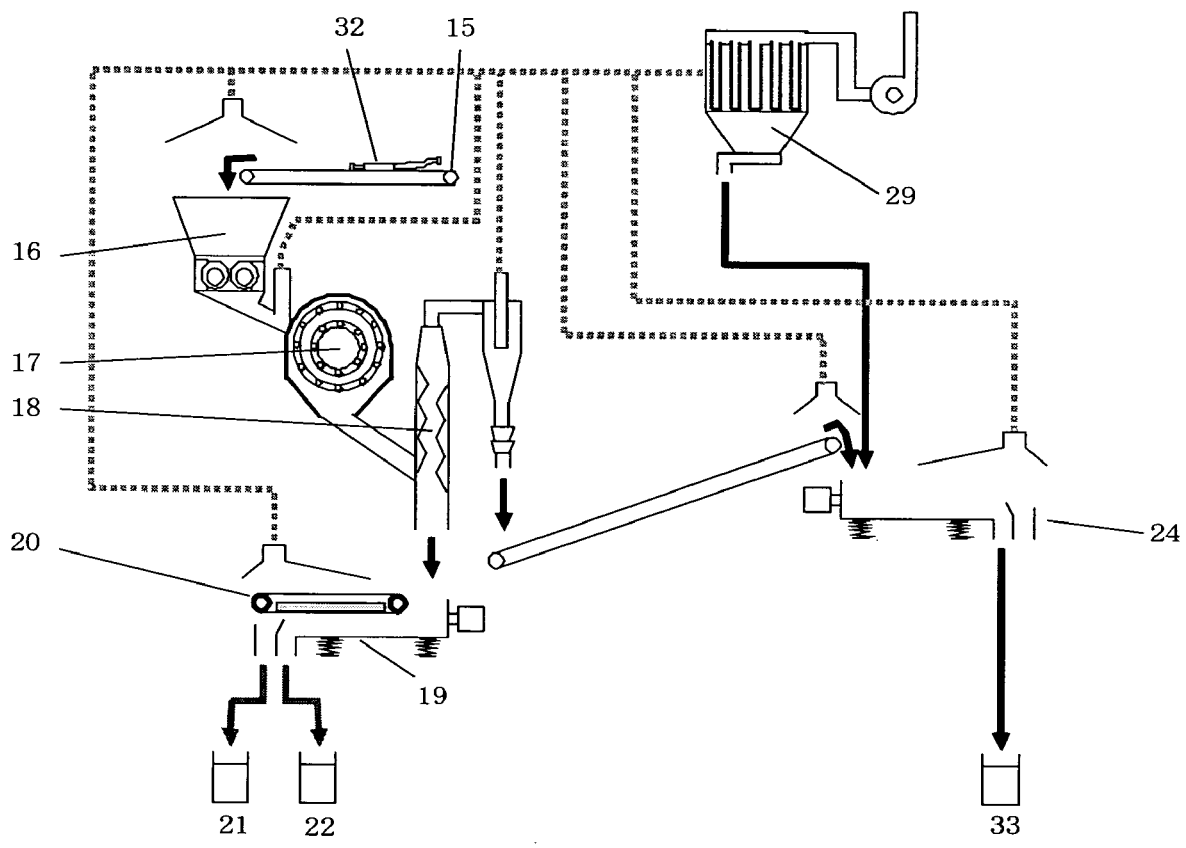
FIG. 6 is a flowsheet schematically illustrating a method of separating and processing a "ceramic catalyst carrier" of waste catalysts of an internal-combustion engine, utilizing a "pneumatic separator", in accordance with a third embodiment of the present invention.

FIG. 6 illustrates a method of separating a waste catalyst 32 of an internal-combustion engine having a "ceramic catalyst carrier", utilizing a shearing-type pulverizer and a cage mill that is an impact-type crusher. The process flow shown in FIG. 6 is characterized by the use of a "pneumatic separator".

A conveyor 15 feeds the waste catalyst 32 of an automobile having a ceramic catalyst carrier 4 into a 2-shaft shearing crusher 16 that is a shearing-type crusher. The crusher 16 has a 100-HP electric motor. The crusher 16 also has two rotational shafts that rotate in the horizontal direction at low speeds of 13 rpm and 16 rpm, respectively. A disc-like shearing blade of 50 mm in width is attached to each of the rotational shafts in an alternate manner.

In the crusher 16, the exhaust gas pipes 9 and 12, the manifold 13, the protection cover 11, the metal cover 10, and the ceramic catalyst carrier 4 are pulverized or sheared to pieces of 50 mm in width. The ceramic catalyst carrier 4 covered with the metal cover 10 virtually crumbles down at this point.

Although most pieces of the ceramic catalyst carrier 4 can be retrieved, some pieces still remain inside the metal cover 10.

The exhaust gas pipes 9 and 12 that are made of hard cast steel, and the manifold 13, are compressively crushed at the time of shearing, and are crushed to pieces.

The protection cover 11, the metal cover 10, and the ceramic catalyst carrier 4 are crushed to particulate objects.

The pieces of the ceramic catalyst carrier 4 that still remain inside the metal cover 10 are separated from the metal cover 10 by a cage mill 17. The cage mill 17 also pulverizes the pieces of the ceramic catalyst carrier 4 and the metal cover 10 to particles. The cage mill 17 has two cage-type rotors that rotate in opposite directions to each other. More specifically, each of the two cage-type rotors rotates at a rotational speed of 1000 rpm and at a relative circumferential speed of 80 m/s, thereby feeding raw materials into the center of an inner cage. The distance between each two pins of the cages is 100 mm. Therefore, the raw materials remain inside only for a short time, and are quickly separated and immediately discharged.

The discharged objects are then processed by a pneumatic separator 18 at a wind speed of 15 m/s. The pneumatic separator 18 separates the small and light fragments of the ceramic catalyst carrier 4, from the large and heavy fragments of the exhaust gas pipes 9 and 12, the manifold 13, the protection cover 11, and the metal cover 10.

The fragments of the exhaust gas pipes 9 and 12, the manifold 13, the protection cover 11, which have been processed by the cage mill 17 and separated by the pneumatic separator 18, are then divided into iron scrap 21 and nonmagnetic scrap 22 by a magnetic separator 20 that is hung above a vibratory conveyor 19.

As shown in Table 3, most of the iron materials are allocated to the magnetic side, while most of the other materials such as nickel and chromium are allocated to the nonmagnetic side.

The above crushers, the magnetic separators, the sifter, and the feeders such as the vibratory conveyors, generate dust that contains a large quantity of precious metals. Therefore, a bag filter 29 is provided to collect the dust.

At this point, the collected dust is regarded as fragments of the ceramic catalyst carrier 4 containing precious metals.

As can be seen from Table 3, the precious metal such as platinum, palladium, and rhodium are completely recovered from the waste catalyst of an automobile having the ceramic catalyst carrier 4. The recovered precious metals are contained in ceramic catalyst carrier particles and particulate matters 33.

Unlike a case of processing a metallic catalyst carrier, the precious metals are not concentrated. However, a ceramic catalyst carrier neither containing nickel nor having a metal cover does not adversely affect a copper smelting procedure that involves pyro-processing. For this reason, a ceramic catalyst carrier can be processed through a copper smelting procedure using a PS converter, for example.

Also, there is no need to carry out crushing for a process to be carried out in an electric furnace through pyro-processing for recovering precious metals. The same applies to hydro-processing.

TABLE 3

| | RECOVERY RATE | | | | | | |
| --- | --- | --- | --- | --- | --- | --- | --- |
| | WEIGHT | Pt | Pd | Rh | Fe | Cr | Ni |
| MAGNETIC MATERIALS 21 | 79.2% | 0.1% | 0.1% | 0.1% | 88.6% | 16.4% | 0.0% |
| NONMAGNETIC MATERIALS 22 | 9.9% | 0.4% | 0.3% | 0.3% | 10.7% | 83.4% | 99.9% |
| CERAMIC CATALYST CARRIER PARTICLES/ PARTICULATE MATTERS 33 | 10.9% | 99.5% | 99.6% | 99.6% | 0.7% | 0.2% | 0.1% |

(Fourth Embodiment)

Figure 7:
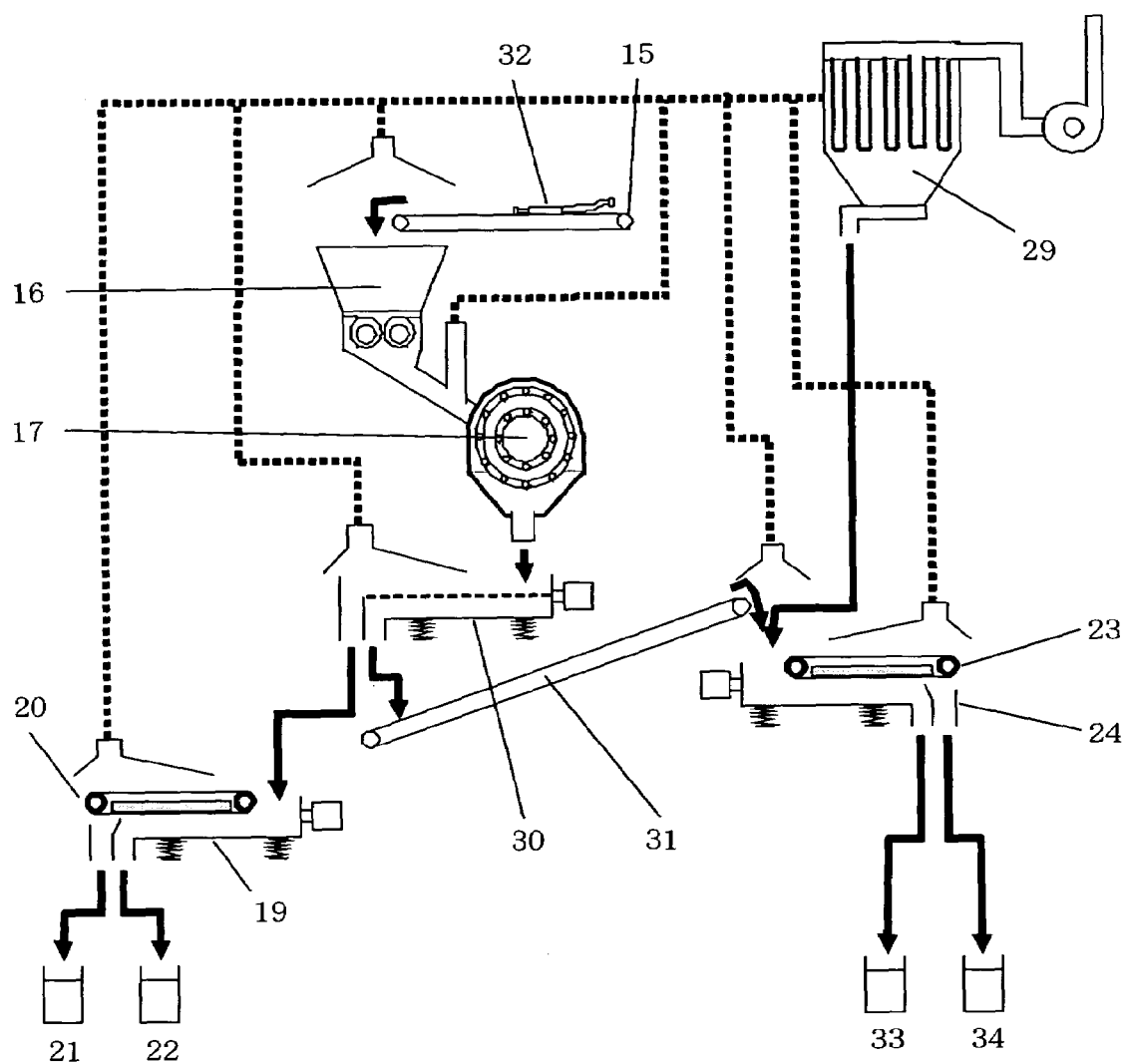
FIG. 7 is a flowsheet schematically illustrating a method of separating and processing a "ceramic catalyst carrier" of waste catalysts of an internal-combustion engine, utilizing a "sieving separator", in accordance with a fourth embodiment of the present invention.

FIG. 7 illustrates a method of separating a waste catalyst 32 of an internal-combustion engine having a "ceramic catalyst carrier", utilizing a shearing-type crusher and a cage mill that is an impact-type pulverizer. The method shown in FIG. 7 is characterized by "sieving separation" having the same effect as the above described pneumatic separation.

The object to be processed in this embodiment, and the shearing-type crusher and the cage mill to be used in this embodiment, are the same as those used in the third embodiment.

The discharged objects that have been separated and separated by the cage mill 17 are then processed by a vibratory sifter 30 having 30 mm sieve openings. Through the sieving separation, the small and light fragments of the ceramic catalyst carrier 4 and the smaller pieces of the exhaust gas pipes 9 and 12 and the manifold 13, are separated from the large and heavy fragments of the exhaust gas pipes 9 and 12, the manifold 13, the protection cover 11, and the metal cover 10.

The fragments of the exhaust gas pipes 9 and 12, the manifold 13, the protection cover 11, which have been processed by the cage mill 17 and separated by the vibratory sifter 30, are then divided into iron scrap 21 and nonmagnetic scrap 22 by a magnetic separator 20 that is hung above a vibratory conveyor 19.

The fragmented ceramic catalyst carrier 4 and the smaller pieces of the exhaust gas pipes 9 and 12 and the manifold 13 are transported on a belt conveyor 31, and are then supplied to a magnetic separator 24 that is hung above a vibratory conveyor 23. The magnetic separator 24 allocates the smaller pieces of the exhaust gas pipes 9 and 12 as iron scrap 34 on the magnetic side, and obtains particulate matters 33 containing precious metals on the nonmagnetic side.

As shown in Table 4, most of the iron materials are allocated to the magnetic side, while most of the other materials such as nickel and chromium are allocated to the nonmagnetic side.

The above crushers, the magnetic separators, the sifter, and the feeders such as the vibratory conveyors, generate dust that contains a large quantity of precious metals. Therefore, a bag filter 29 is provided to collect the dust.

Being the particles of the ceramic catalyst carrier 4, the collected dust is regarded as the particulate matters 33 containing precious metals.

As can be seen from Table 4, the precious metals are completely recovered as the ceramic catalyst carrier particulate matters 33 from the waste catalyst of an automobile having the ceramic catalyst carrier 4.

TABLE 4

| | RECOVERY RATE | | | | | | |
|---|---|---|---|---|---|---|---|
| | WEIGHT | Pt | Pd | Rh | Fe | Cr | Ni |
| MAGNETIC MATERIALS 21 | 65.2% | 0.1% | 0.1% | 0.1% | 71.8% | 9.5% | 0.0% |
| NONMAGNETIC MATERIALS 22 | 9.8% | 0.4% | 0.5% | 0.3% | 10.5% | 85.4% | 98.5% |
| IRON SCRAP 34 | 15.2% | 0.3% | 0.2% | 0.3% | 16.4% | 4.8% | 1.3% |
| CERAMIC CATALYST CARRIER PARTICLE/ PARTICULATE MATTERS 33 | 9.8% | 99.2% | 99.2% | 99.3% | 1.3% | 0.3% | 0.2% |

Unlike a case of processing a metallic catalyst carrier, the precious metals are not concentrated. However, a crushed ceramic catalyst carrier neither containing nickel nor having a metal cover does not adversely affect a copper smelting procedure that involves pyro-processing. For this reason, a ceramic catalyst carrier can be processed through a copper smelting procedure using a PS converter, for example.

Also, there is no need to carry out crushing for a process to be carried out in an electric furnace through pyro-processing for recovering precious metals. The same applies to hydro-processing.

As described so far, in accordance with the present invention, there is no need to perform the pre-processing of removing the exhaust gas pipes, the manifold, the protection cover, and the metal cover. Accordingly, the crushing and separating processes can be immediately carried out.

Also, the precious metals contained in a catalyst carrier can be recovered as a resultant concentrate with high purity.

Furthermore, the precious metals contained in a catalyst carrier can be more efficiently recovered through a copper smelting procedure.

Also, the precious metals that do not form the primary components of a catalyst carrier in terms of weight can be recovered with high purity, and the other components can be recovered separately from one another.

After the crushing and sieving performed on a metallic catalyst carrier in the second stage, magnetic separation is performed to recover precious metals (such as Pt, Pd, and Rh) with little Fe at a recovery rate as high as 95% to 98%.

Since the Fe content is removed before the fragments are put into a converter furnace, the amount of slag can be reduced in converting operations.

Also, the processing amount can be reduced at a time of briquetting or the like.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of separating and processing a catalyst carrier that is contained in a processing object that includes a catalyst carrier metal cover to which an exhaust gas pipe is still connected, and magnetic carrier foil or a ceramic carrier, a surface-enlarging coating film provided on the magnetic carrier foil or the ceramic carrier, and the catalyst carrier containing precious metal, the method comprising the steps of:
crushing the catalyst carrier and the metal cover to which the exhaust gas pipe is still connected, using a first crusher of a shearing type;
breaking the catalyst carrier containing precious metal from the metal cover, using an impact-type pulverizer; and
separating the catalyst carrier containing precious metal from the exhaust gas pipe and the metal cover, using a separator.

2. The method as claimed in claim 1, further comprising the steps of:
pulverizing a metallic catalyst carrier containing precious metal, using a second crusher, the pulverizing being carried out after the separating step using the separator; and
dividing fragments and particulate matters containing the precious metal into a precious metal concentrate and catalyst carrier pieces not containing a great amount of the precious metal.

3. The method as claimed in claim 1, wherein the separator is a pneumatic separator.

4. The method as claimed in claim 1, wherein the separator is a sieving separator.

5. The method as claimed in claim 1, further comprising the steps of:
dividing the catalyst carrier containing precious metal that have been separated by the separator into magnetic matters and nonmagnetic matters, using a magnetic separator; and
pulverizing the magnetic matters, using a second crusher.

* * * * *